Jan. 3, 1950     H. R. MITCHELL     2,493,158

AUTOMOBILE CLOTHES HANGER SUPPORT

Filed Oct. 23, 1947

Harold R. Mitchell
INVENTOR.

BY *Clarence A. O'Brien*
*and Harvey B. Jackson*
Attorneys

Patented Jan. 3, 1950

2,493,158

UNITED STATES PATENT OFFICE 2,493,158

AUTOMOBILE CLOTHES HANGER SUPPORT

Harold R. Mitchell, Bemidji, Minn.

Application October 23, 1947, Serial No. 781,624

2 Claims. (Cl. 224—42.1)

This invention relates to new and useful improvements in clothes hangers and the primary object of the present invention is to provide a clothes hanger so designed as to facilitate the same to be quickly and readily secured to the roof of a vehicle within the interior of the said vehicle.

Another important object of the present invention is to provide a frame including novel and improved means for supporting a plurality of garment hangers in such a manner that the same will not slide or slip during movement of the vehicle.

A further object of the present invention is to provide an automobile hanger including an adjustable frame that is applicable for interior of vehicle roofs of various widths.

A still further aim of the present invention is to provide a clothes hanger that is simple and practical in construction, strong and reliable in use, neat and attractive in appearance, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
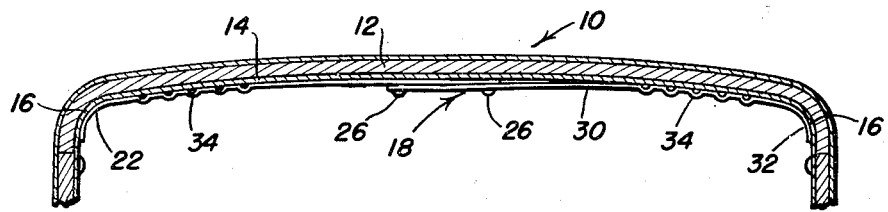
Figure 1 is a transverse vertical sectional view of a vehicle roof, showing the present invention applied thereto.
Figure 2:
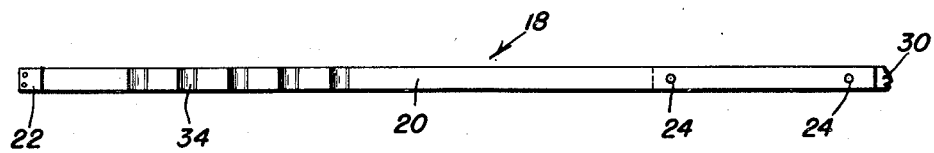
Figure 2 is a bottom plan view of the present invention, and with parts of the movable section broken away and shown in section.
Figure 3:
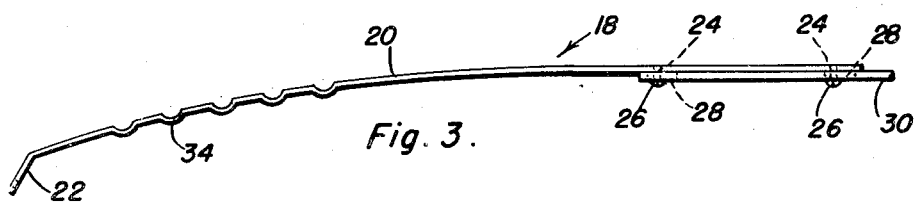
Figure 3 is a side elevational view of Figure 2.
Figure 4:
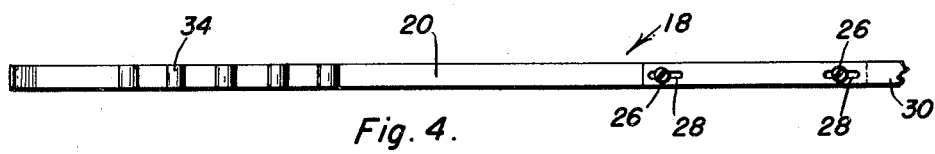
Figure 4 is a top plan view of Figure 2.
Figure 5:
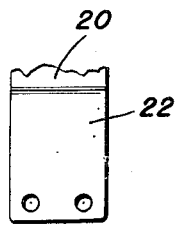
Figure 5 is an enlarged end view of Figure 3, and with parts thereof broken away and shown in section.

Referring now to the drawings in detail, wherein for the purpose of illustration, there is disclosed a preferred embodiment of the present invention, the numeral 10 represents the body of an automobile having a roof 12 with an inner curved wall or lining 14, that has arched side portions 16.

The numeral 18 represents the present clothes hanger frame generally, that is applicable for attachment to the inner wall 14 of the roof 12. This frame 18 comprises an elongated, resilient fixed member 20 having an arcuate end portion 22 that conforms to the curvature of the arch side portions of the lining 14. Projecting outwardly from one face of the fixed member 20, is a plurality of guide lugs 24 having head portions 26. These lugs 24 slidably engage longitudinal slots or guide openings 28 provided in one end of an elongated, resilient movable member 30 whose longitudinal axis aligns the longitudinal axis of the fixed member 20. The free end portion 32 of the movable member 30 is also arcuately formed to conform to the curvature of the arched side portions 16 of the lining 14.

A plurality of longitudinally spaced, transverse loops or arcuate depressions 34 are provided in each of the members 20 and 30 adjacent their arcuate end portions 22 and 32 respectively, and these loops are adapted to engage the hook portions of a plurality of usual garment hangers when the end portions 22 and 32 are rigidly secured to the arched portions of the lining 14.

It should be noted, that when the frame is applied to the lining 14, the upper face of the members 20 and 30 will frictionally bear against the lining 14 to prevent sliding movement of the garment hangers that are received in the loops 34, thus retaining the garments supported by the frame in an evenly spaced position to prevent wrinkling of the garments.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A garment hanger for vehicles comprising an elongated resilient frame member, means securing the end portions of said frame member to the inner surface of a vehicle roof, said frame member yieldingly bearing against the inner surface of a vehicle roof, and a plurality of longitudinally spaced, transverse depressions provided in said frame member adjacent the end portions thereof for receiving hanger hooks said frame member having portions between adjacent depressions also bearing against the inner surface of a vehicle roof and tending to block the movement of a hanger hook from one depression into another depression.

2. Means for detachably supporting garment hangers relative to the roof a vehicle, said means comprising an elongated frame member, means for securing said frame member to the inner surface of a vehicle roof, and a plurality of recesses provided in said frame member for receiving hanger hooks, said frame member bearing against the inner surface of a vehicle roof to retain hanger hooks positioned in said recesses and between the frame member and vehicle roof and to prevent the movement of a hanger hook from one recess into another of the recesses.

HAROLD R. MITCHELL.

REFERENCES CITED

The following references are of record in the file of this patent:

UNITED STATES PATENTS

| Number | Name | Date |
|---|---|---|
| 1,886,574 | Normandy | Nov. 8, 1932 |
| 2,120,619 | Matthiesen | June 14, 1938 |
| 2,253,423 | Fellers et al. | Aug. 19, 1941 |
| 2,292,270 | L'Hara et al. | Aug. 4, 1942 |
| 2,336,274 | Mazet | Dec. 7, 1943 |